June 1, 1937.  J. DUNLOP  2,081,989
MOVING STAIRWAY
Filed Nov. 21, 1934  2 Sheets-Sheet 2

INVENTOR
James Dunlop
BY
ATTORNEY

Patented June 1, 1937

2,081,989

UNITED STATES PATENT OFFICE 2,081,989

MOVING STAIRWAY

James Dunlop, Park Ridge, Ill., assignor to Westinghouse Electric Elevator Company, Chicago, Ill., a corporation of Illinois Application November 21, 1934, Serial No. 754,029

7 Claims. (Cl. 198—16)

My invention relates to moving stairways in which the moving steps are operated by endless gear chains disposed on a plurality of sprocket wheels.

One object of my invention is to provide for stopping a stairway when its steps catch on something which causes an excessive strain on the step gear chains.

Another object is to provide for stopping a moving stairway when excessive elongation or breakage occurs in either or both of its gear chains.

It is also an object to provide for keeping the gear chains on a moving stairway under a predetermined tension during their operation, and to stop the stairway when the tension passes beyond a predetermined value.

Other objects of the invention will, in part, be obvious and will, in part, appear hereinafter. For a better understanding of the invention, reference may be had to the following drawings, in which.

Figure 1:
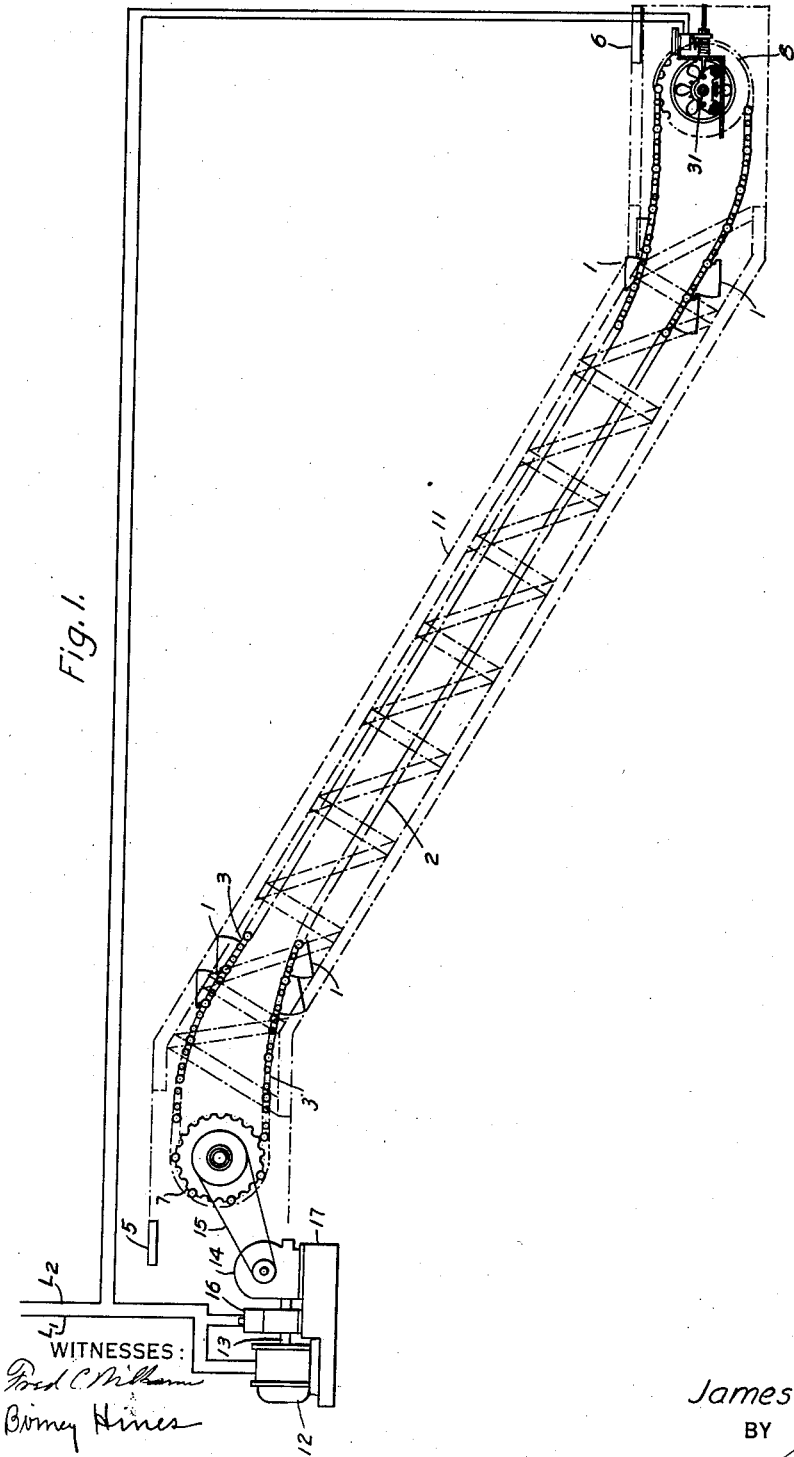
Figure 1 is a view, in side elevation, of a moving stairway constructed in accordance with my invention.
Figure 2:
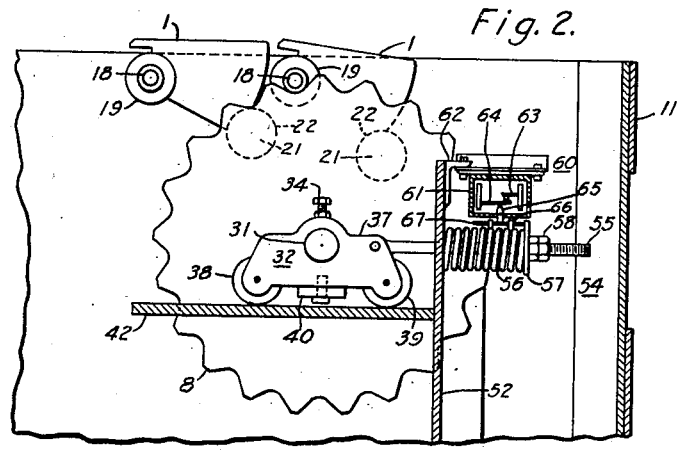
Fig. 2 is a view, partially in side elevation and partially in section, of the sprocket wheels and their supporting means at the lower landing of the stairway along the line II—II in Fig. 3.

Referring more particularly to the drawings, I have illustrated a moving stairway as comprising an endless series of movable steps 1 disposed to be moved along their tracks 2 by a pair of gear chains 3 and 4 between an upper landing 5 and a lower landing 6. The gear chains are supported at the upper landing by a pair of driving sprocket wheels 7 and at the lower landing by a pair of tensioning sprocket wheels 8 and 9. A suitable truss 11 of structural steel is provided for supporting the stairway between the upper landing and the lower landing.

The driving sprocket wheels 7 may be driven by a motor 12 through a shaft 13, a reduction gear 14 and a driving chain 15. A suitable electromagnetic brake 16 is disposed to apply a braking force to the driving shaft 13 when it is desired to stop the stairway. The motor, brake and speed reducing gear may be mounted upon a suitable base plate 17 at the upper landing.

Figure 3:
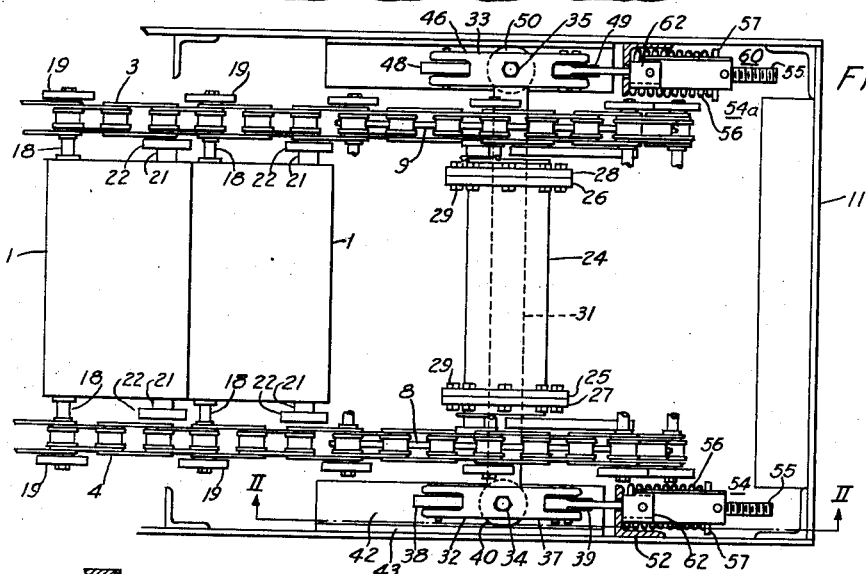
Fig. 3 is a top plan view of the chains, sprocket wheels and their supporting carriage at the lower landing.
Figure 4:
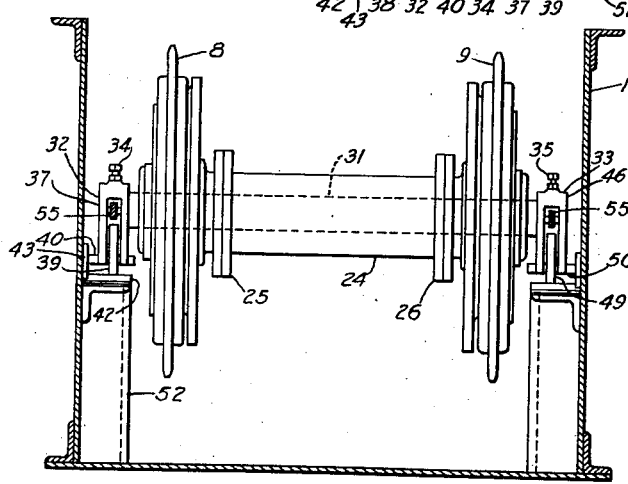
Fig. 4 is a view, in end elevation, of the sprocket wheels and their supporting carriage at the lower landing.

As shown in Fig. 3, each of the steps 1 is mounted upon a suitable front axle 18 which extends through the adjacent joints of the gear chains 3 and 4. A pair of leading wheels 19 are mounted upon the outer ends of the axle 18 for supporting the front portion of the step on the tracks 2. The rear portion of the step is provided with a pair of stub axles 21 upon which a pair of trailing wheels 22 are rotatably mounted in position to engage cooperating portions of the track 2 as the steps move along their course.

The lower sprocket wheels 8 and 9 are connected by a sleeve 24 which is provided with suitable flanges 25 and 26 that are bolted to suitable cooperating flanges 27 and 28 upon the inner portions of the sprocket wheels by a plurality of bolts 29. As shown, the sleeve 24 provides a firm and fixed connection between the sprocket wheels at the lower landing and causes them to rotate in unison with each other.

In order to provide for keeping the gear chains under such predetermined tension as may be deemed advisable, the sprocket wheels at the lower landing are mounted upon a pivotal carriage comprising a shaft 31 and a pair of end trucks 32 and 33. The shaft passes through the sleeve 24 and the central portion of the gear wheels 8 and 9 and is supported by the trucks 32 and 33 disposed at its ends. A pair of set screws 34 and 35 are mounted in the upper portions of the trucks 32 and 33 in position to screw into engagement with the end portions of the shaft 31 to prevent rotation of the shaft and also to secure the ends of the shaft in the trucks.

The truck 32 comprises a heavy casting or frame 37 and a pair of supporting wheels 38 and 39 and a guiding wheel 40. The wheels 38 and 39 are mounted in slots in the casting in a plane parallel to the plane of the sprocket wheel 8. The wheel 40 is disposed in a horizontal plane at right angles to the plane of the sprocket wheel. A horizontal track rail 42 is provided underneath the truck for supporting the wheels 38 and 39. A guard rail 43 is disposed on the outside of the guide wheel 40 and in a plane parallel to the plane of the sprocket wheel 8 to limit sidewise movement of the truck. The guard rail 43 may be welded to the track rail 42 to unite the two in a rigid angle iron track and guide. The truck 33 is similar to truck 32 and comprises a heavy cast frame 46 a pair of supporting wheels 48 and 49 and a guide wheel 50 operating on a track rail and a guide rail similar to those associated with the truck 32.

In view of this description of the carriage for the lower sprocket wheels, it will be seen that the carriage can move back and forth upon its wheels 38 and 39 and 48 and 49, and can turn in a pivotal manner by reason of the horizontally disposed wheels 40 and 50. The tracks 42 are welded to and supported by upright vertical angle iron members 52 of the stairway truss 11.

A tensioning means 54 is provided for each truck to keep the gear chains under such tension as may be desired.

The tension device 54 comprises a rod 55 pivotally connected to the truck 32 in position to extend rearwardly through the frame member and a compression spring 56 concentrically disposed on that portion of the rod 55 extending rearwardly beyond frame member 52. This spring may be held under such compression as is desired by means of a washer 57 and a pair of nuts 58 also concentrically mounted on the rod 55. The nuts 58 are so disposed on the screw threaded end of the rod 55 that the position of the washer 57 and, therefore, the amount of compression on the spring 56 may be adjusted to any desired amount. The truck 33 is provided with a tensioning means 54a that is similar to the tensioning means described for the truck 32. Therefore, it will be obvious that the tension on the gear chains may be adjusted to any desirable amount by adjusting the nuts 58 on the rods 55.

A safety switch 60 is mounted adjacent to each of the tensioning devices 54. The switch comprises a frame 61 supported by an angle iron 62 mounted on a portion of the truss frame 11. A contact member 63 is suitably mounted in the frame 61 in position to be engaged by a cooperating spring contact member 64. The contact member 64 is so constructed that it will spring away from the contact member 63 unless forceably held in engagement therewith.

A trigger 65 is provided for normally holding the spring contact members 64 in engagement with the stationary contact member 63. The trigger 65 is pivotally mounted in the frame 61 with its lower end extending downwardly for operation by a pair of nuts 66 disposed on a rod 67. The nuts 66 may be adjusted to any desired position on the rod so that the trigger 65 will be operated to open the switch 60 when the rod moves beyond the predetermined distance defined by the setting of the nuts. The rod 67 is mounted upon the upper edge of the washer 57 which is secured to the rod 55 extending from the truck 32 and is therefore moved in accordance with the movements of the truck. The tensioning device 54a for the truck 33 is provided with a similar safety switch.

In view of the foregoing construction, it will be seen that each of the switches 60 and its operating nuts may be so adjusted that the switches will open if either of the trucks moves beyond a predetermined distance in either direction.

As shown, each safety switch is so connected in the control circuit represented by the conductors L1 and L2 connected to the motor 12 and the electromagnetic brake 16 in Fig. 1, that the motor will be stopped and the brake applied when either of the trucks 32 or 33 moves beyond a predetermined distance in either direction. In view of the mounting of the trucks upon the floor wheels and the guiding wheels, the carriage may easily and quickly turn in pivotal manner whenever more force is applied to one sprocket wheel than to the other sprocket wheel at the lower landing. This pivotal turning of the carriage may, by the construction of the switches 60, open both switches and cut off the power from the motor 12 and the brake 16, thus stopping the motor and applying the brake to stop the stairway. Also, it will be obvious that if the moving steps catch upon an obstruction or jump their tracks and thus become unduly difficult to move, the pull of the driving sprockets 7 will apply such a force to the sprocket wheels 8 and 9 or to one of them, that the carriage comprising the shaft and trucks will be turned or moved to such a position that the safety switches 60 will be opened, thus cutting off power from the motor and applying the brake 16 to stop the motor and the stairway.

Also, it will be apparent that if either one of the gear chains breaks, the consequent release of the pull of the driving motor on that chain will permit the corresponding sprocket wheel to be pulled outwardly by its tension spring. The outward movement of that sprocket wheel will move its truck outwardly and thereby effect the opening of its corresponding switch 60 to cut off the motor and apply the brake to stop the stairway.

Furthermore, the connection of the sprocket wheels by the sleeve 31 provides a simple means for correctly spacing the sprocket wheels and causing them to rotate synchronously.

Although the illustrated example constitutes a particular embodiment of my invention, I do not limit myself strictly to the details shown, since manifestly the same may be varied considerably without departing from the spirit of the invention as defined in the appended claims.

I claim as my invention:

1. In a moving stairway provided with a plurality of steps disposed between an upper and a lower landing, a pair of gear chains for operating said steps, a pair of sprocket wheels disposed at each landing for supporting and operating the gear chains, means for driving the sprocket wheels at one landing, a carriage at the other landing for supporting the sprocket wheels at that landing, a plurality of carriage supporting wheels, a track for the carriage supporting wheels, an anti-friction device mounted on each outer side of the carriage to project therefrom at approximately midway between the front end and the rear end of the carriage, and means disposed at each side of the stairway for cooperation with the anti-friction devices to guide the movement of the carriage and to facilitate pivotal movement of the carriage in a horizontal plane.

2. In a moving stairway provided with a plurality of steps disposed between an upper and a lower landing, a pair of gear chains for operating the steps, a pair of sprocket wheels disposed at each landing for operating the gear chains, means for driving the sprocket wheels at one landing, a sleeve connecting the sprocket wheels at the other landing to cause them to operate synchronously, a carriage for supporting the sprocket wheels and sleeve at said other landing, said carriage comprising a shaft extending through the sleeve, and a pair of end members for supporting the shaft.

3. In a moving stairway provided with a plurality of steps disposed between an upper and a lower landing, a pair of gear chains for operating the steps, a pair of sprocket wheels disposed at each landing for operating the gear chains, means for driving the sprocket wheels at one landing, a sleeve connecting the sprocket wheels at the other landing to cause them to operate synchronously, a carriage for supporting the sprocket wheels and sleeve at said other landing, said carriage comprising a shaft extending through the sleeve and a pair of end members for supporting the shaft, and a track for the end members.

4. In a moving stairway provided with a plurality of steps disposed between an upper and a lower landing, a pair of gear chains for operating the steps, a pair of sprocket wheels disposed at each landing for operating the gear chains, means for driving the sprocket wheels at one landing, a sleeve connecting the sprocket wheels at the other landing to cause them to operate synchronously, a carriage for supporting the sprocket wheels and sleeve at said other landing, said carriage comprising a shaft extending through the sleeve, a pair of end members for supporting the shaft, a plurality of wheels on the end members, and a track for engaging the wheels to support the end members.

5. In a moving stairway provided with a plurality of steps disposed between an upper and a lower landing, a pair of gear chains for operating the steps, a pair of sprocket wheels disposed at each landing for operating the gear chains, means for driving the sprocket wheels at one landing, a sleeve connecting the sprocket wheels at the other landing to cause them to rotate synchronously, a carriage for supporting the sprocket wheels and sleeve at said other landing, said carriage comprising a shaft extending through the sleeve and a pair of end members for supporting the shaft, a plurality of wheels on the end members, and a track for engaging the wheels to support the end members, and means for applying a predetermined tension to the end members to keep the gear chains under tension.

6. In a moving stairway provided with a plurality of steps disposed between an upper and a lower landing, a pair of gear chains for operating the steps, a pair of sprocket wheels disposed at each landing for operating the gear chains, means for driving the sprocket wheels at one landing, a sleeve connecting the sprocket wheels at the other landing to cause them to rotate synchronously, a carriage for supporting the sprocket wheels and sleeve at said other landing, said carriage comprising a shaft extending through the sleeve and a pair of end members for supporting the shaft, a plurality of wheels on the end members, a track for engaging the wheels to support the end members, and a safety device connected to each end member and responsive to a predetermined movement thereof for rendering the driving means ineffective and stopping the stairway.

7. In a moving stairway provided with a plurality of steps disposed between an upper and a lower landing, a pair of gear chains for operating said steps, a pair of sprocket wheels disposed at each landing for supporting and operating the gear chains, means for driving the sprocket wheels at one landing, a carriage at the other landing for supporting the sprocket wheels at that landing, a plurality of carriage supporting wheels, a track for the carriage supporting wheels, a carriage guiding wheel rotatably mounted in a horizontal plane in each outer side of the carriage and approximately midway between the front and rear end of the carriage, and means disposed at each side of the stairway for cooperation with the guiding wheels to guide the movement of the carriage and to facilitate pivotal movement of the carriage in a horizontal plane.

JAMES DUNLOP.